United States Patent
Duan et al.

(10) Patent No.: US 8,958,178 B2
(45) Date of Patent: Feb. 17, 2015

(54) REDUCING SLIDER BOUNCE IN A HARD DISK DRIVE

(75) Inventors: Shanlin Duan, Fremont, CA (US); Jizhong He, San Jose, CA (US); John Stephen Hopkins, Gilroy, CA (US)

(73) Assignee: HGST Netherlands B.V., Amsterdam (NL)

( * ) Notice: Subject to any disclaimer, the term of this patent is extended or adjusted under 35 U.S.C. 154(b) by 1075 days.

(21) Appl. No.: 12/511,840

(22) Filed: Jul. 29, 2009

(65) Prior Publication Data

US 2011/0026167 A1    Feb. 3, 2011

(51) Int. Cl.
G11B 17/32    (2006.01)
G11B 5/60    (2006.01)
G11B 5/10    (2006.01)
G11B 5/40    (2006.01)

(52) U.S. Cl.
CPC .............. *G11B 5/6005* (2013.01); *G11B 5/102* (2013.01); *G11B 5/40* (2013.01)
USPC .................. 360/235.1; 360/235.2; 360/235.3; 360/246.2

(58) Field of Classification Search
USPC ................................. 360/235.1–235.3, 246.2
See application file for complete search history.

(56) References Cited

U.S. PATENT DOCUMENTS

| | | | |
|---|---|---|---|
| 4,605,977 A | 8/1986 | Matthews | |
| 5,764,432 A | 6/1998 | Kasahara | |
| 5,991,120 A * | 11/1999 | Sato | 360/246.2 |
| 6,359,752 B1 | 3/2002 | Imamura | |
| 6,611,399 B1 | 8/2003 | Mei et al. | |
| 6,690,543 B2 | 2/2004 | Kurita et al. | |
| 6,776,690 B2 | 8/2004 | Bunch et al. | |
| 7,196,016 B2 | 3/2007 | Buchan et al. | |
| 7,230,799 B2 | 6/2007 | Lille | |
| 2001/0012176 A1 * | 8/2001 | Boutaghou et al. | 360/97.01 |
| 2008/0158704 A1 * | 7/2008 | Knigge et al. | 360/31 |

FOREIGN PATENT DOCUMENTS

| | | |
|---|---|---|
| EP | 0242597 | 10/1987 |
| JP | 62003476 | 1/1987 |
| JP | 4157685 | 5/1992 |
| JP | 5151734 | 6/1993 |
| JP | 7006539 | 1/1995 |
| JP | 11086484 | 3/1999 |

OTHER PUBLICATIONS

Sheng, et al., "A Micro-Machined Dual Slider-Suspension for Near-Contact and Contact Recording", *IEEE Transactions on Magnetics*, vol. 35, No. 5, (Sep. 1999),2472-2474.

(Continued)

*Primary Examiner* — Wayne Young
*Assistant Examiner* — Carlos E Garcia

(57) ABSTRACT

Reducing slider bounce within a hard disk drive. A force is received at a first material while the first material is in contact with a disk of a hard disk drive; the first material comprising a portion that is flexible in a first direction and is substantially non-flexible in a second direction. The first direction is a direction that is normal to the disk and the second direction is a direction that is parallel to a surface of the disk. The force is substantially absorbed by the portion that is flexible to reduce the force associated with interaction between the first material and the disk, thereby reducing slider bounce within the hard disk drive.

9 Claims, 4 Drawing Sheets

(56) References Cited

OTHER PUBLICATIONS

Sheng, et al., "Design and Analysis of MEMS-based Slider Suspensions for a High-Peformance Magnetic Recording System", *IOP Publishing Ltd*,(Nov. 12, 1999),64-71.

Yeack-Scranton, et al., "An Active Slider for Practical Contact Recording", *IEEE Transactions on Magnetics*, vol. 26 No. 5 (Sep. 1990),2478-2483.

Ono, et al., "Analysis of the Friction-Induced Self-Excited Vibration of a Contact-Recording Head Slider Supported by a Cantilever Beam", *Institution of Electrical Engineers*, (Jan. 1999),59-65.

\* cited by examiner

300

Start

Receive a force at a first material while the first material is in contact with a disk of a hard disk drive; the first material comprising a portion that is flexible in a first direction and is substantially non-flexible in a second direction, wherein the first direction is a direction that is normal to the disk and the second direction is a direction that is parallel to a surface of the disk.
305

Substantially absorb the force by the portion that is flexible to reduce the force associated with interaction between the first material and the disk, thereby reducing slider bounce within the hard disk drive.
310

Further reduce the force while in contact with the disk via utilizing a second material coupled with a disk-facing side of the first material, the second material configured for making contact with the disk.
315

End

FIG. 3

REDUCING SLIDER BOUNCE IN A HARD DISK DRIVE

FIELD

Embodiments of the present technology relate generally to the field of computing.

BACKGROUND

At least one hard disk drive (HDD) is used in almost all computer system operations. In fact, most computing systems are not operational without some type of HDD to store the most basic computing information such as the boot operation, the operating system, the applications, and the like. In general, the HDD is a device which may or may not be removable, but without which the computing system will generally not operate.

The basic HDD model includes a storage disk or hard disk that spins at a designed rotational speed. An actuator arm with a suspended slider is utilized to reach out over the disk. The slider is coupled with a suspension that supports both the body of the slider and a head assembly that has a magnetic read/write transducer or head or heads for reading/writing information to or from a location on the disk. The complete head assembly, e.g., the suspension, slider, and head, is called a head gimbal assembly (HGA).

In operation, the hard disk is rotated at a set speed via a spindle motor assembly having a central drive hub. There are tracks at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk as a string of bits.

Generally, it is becoming increasingly challenging for sliders to fly stably in close proximity to the hard disk, such as within a few nanometers. However, due to ever increasing aerial density, it is important for a slider to fly as close to the disk as possible, possibly even making contact with the hard disk (contact recording). However, the forces involved in contact recording cause the slider body to bounce, thus creating possible error in information regarding the read/write on the hard disk. Furthermore, contact recording causes wear to both the head assembly and the hard disk, thereby adversely affecting the performance of the hard disk.

BRIEF DESCRIPTION OF THE DRAWINGS

FIG. 3 is a flowchart of a method for reducing slider bounce within a hard disk drive, in accordance with embodiments of the present technology.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Generally, the forces involved in the interaction between a slider and a disk cause the slider to bounce and cause wear on the disk. Slider bounce may cause read/write errors. Embodiments of the present technology reduce the slider bounce by reducing the effect of the forces involved in slider/disk interaction. Slider bounce is reduced by coupling a material with the slider that is flexible enough to absorb the forces associated with contact recording, and stiff enough to avoid being torqued from the forces. Thus, embodiments of the present technology reduce or even eliminate slider bounce associated with contact recording.

The discussion below will begin with an overview of a hard disk drive and components connected therewith. The discussion will then focus on embodiments of a device and method for reducing slider bounce within a hard disk drive.

Hard Disk Drive

Figure 1:
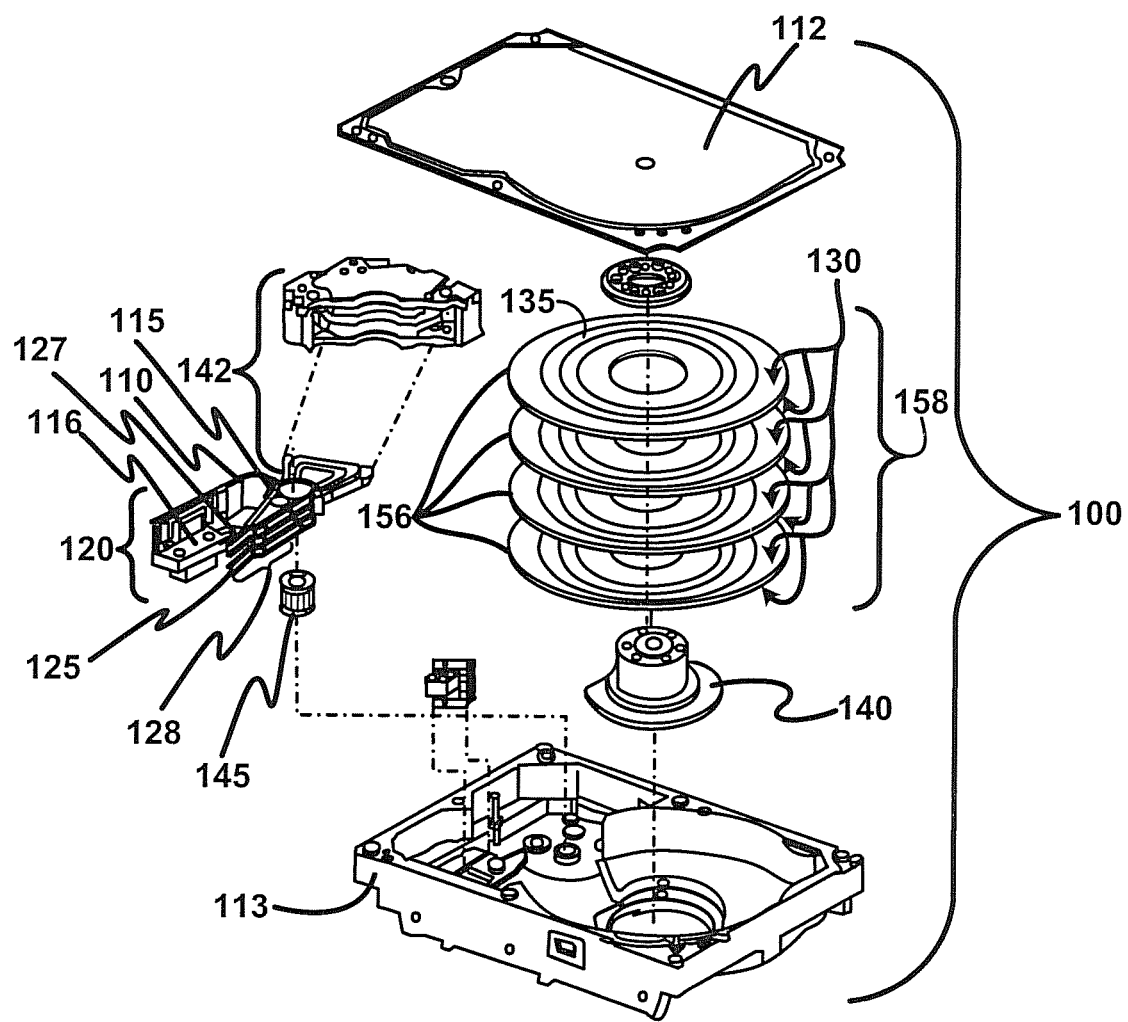
FIG. 1 is an isometric blow-apart of an HDD, in accordance with embodiments of the present technology.

With reference to FIG. 1, an isometric blow-apart of HDD 100 is shown in accordance with an embodiment of the present invention. Base casting 113 provides coupling points for components and subassemblies such as disk stack 158, voice coil motor (VCM) 142, and HSA 120. Disk stack 158 is coupled with base casting 113 by means of motor-hub assembly 140. Motor-hub assembly 140 will have at least one disk 156 coupled with it such that disk 156 can rotate about an axis common to motor-hub assembly 140 and the center of disk 156. Disk 156 has at least one disk surface 130 upon which reside data track 135. HSA 120, referred to as an actuator when coupled with pivot bearing 145, comprises suspension 127, which suspends hard disk drive slider 125 next to disk surface 130, and connector 116, which conveys data between A/E module 115 and a host system wherein HDD 100 resides. Suspension 127 and hard disk drive slider 125 comprise head gimbal assembly (HGA) 128. Flex cable 110, which is part of HSA 120, conveys data between connector 116 and HSA 120.

HSA 120 is coupled pivotally with base casting 113 by means of pivot bearing 145, such that VCM 142 can move HGA 128 with slider 125 arcuately across disk surface 130. Upon assembly of HSA 120, disk stack 158, VCM 142, and other components with base casting 113, cover 112 is coupled with base casting 113 to enclose these components and subassemblies into HDD 100.

Example Architectures for Reducing Slider Bounce within a Hard Disk Drive

Figure 2A:
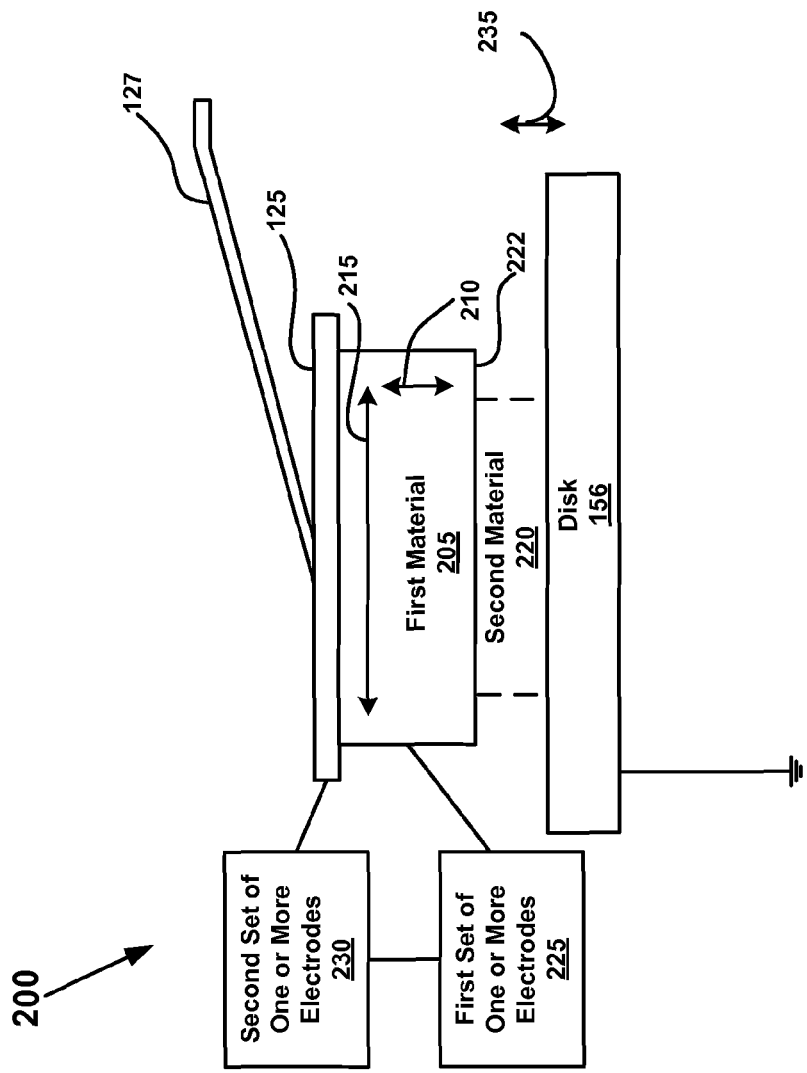
FIG. 2A is a block diagram of an example slider assembly for reducing slider bounce within a hard disk drive, in accordance with embodiments of the present technology.

FIG. 2A is a block diagram of an example slider assembly 200 for reducing slider bounce within HDD 100. Slider assembly 200 includes a disk-facing portion of slider 125 coupled with first material 205. Coupling may be accomplished in any manner that provides adhesion and still enables slider assembly 200 to reduce slider bounce within HDD 100. In one embodiment, first material 205 is configured to be flexible in first direction 210 and substantially non-flexible in second direction 215. "Substantially non-flexible" refers to the described portion in second direction 215 at least being stiffer than the flex in first direction 210.

In one embodiment, first direction 210 comprises a vertical direction in which the vertical direction refers to a direction that is normal to disk 156. In one embodiment, second direction 215 comprises a horizontal direction in which the horizontal direction refers to a direction that is parallel to a surface of disk 156.

Referring still to FIG. 2A, in one embodiment in accordance with the present technology, slider assembly 200 includes second material 220 coupled with first material 205 on the side 222 of first material 205 that faces disk 156. Second material 220 is configured for making contact with disk 156. In one embodiment, second material 220 comprises the same composition as slider 125. For example, slider 125 and second material 220 may be alumina. In another example, slider 125 and second material 220 may be alumina with a carbon overcoat.

Referring to FIG. 2A, in another embodiment, second material 220 may be spherically-shaped. It is appreciated that second material 220 may come in any shape that is configured to make contact with disk 156. In yet another embodiment, slider assembly 200 further includes first set of one or more electrodes 225 coupled with first material 205 and second set of one or more electrodes 230 coupled with first set of one or more electrodes 225 and slider 125.

In another embodiment in accordance with the present technology and with reference still to FIG. 2A, a device for reducing slider bounce within HDD 100 includes first material 205 coupled with slider 125 of HDD 100. As described herein, first material 205 includes a portion that is flexible in first direction 210 and that is substantially non-flexible in second direction 215.

Figure 2B:
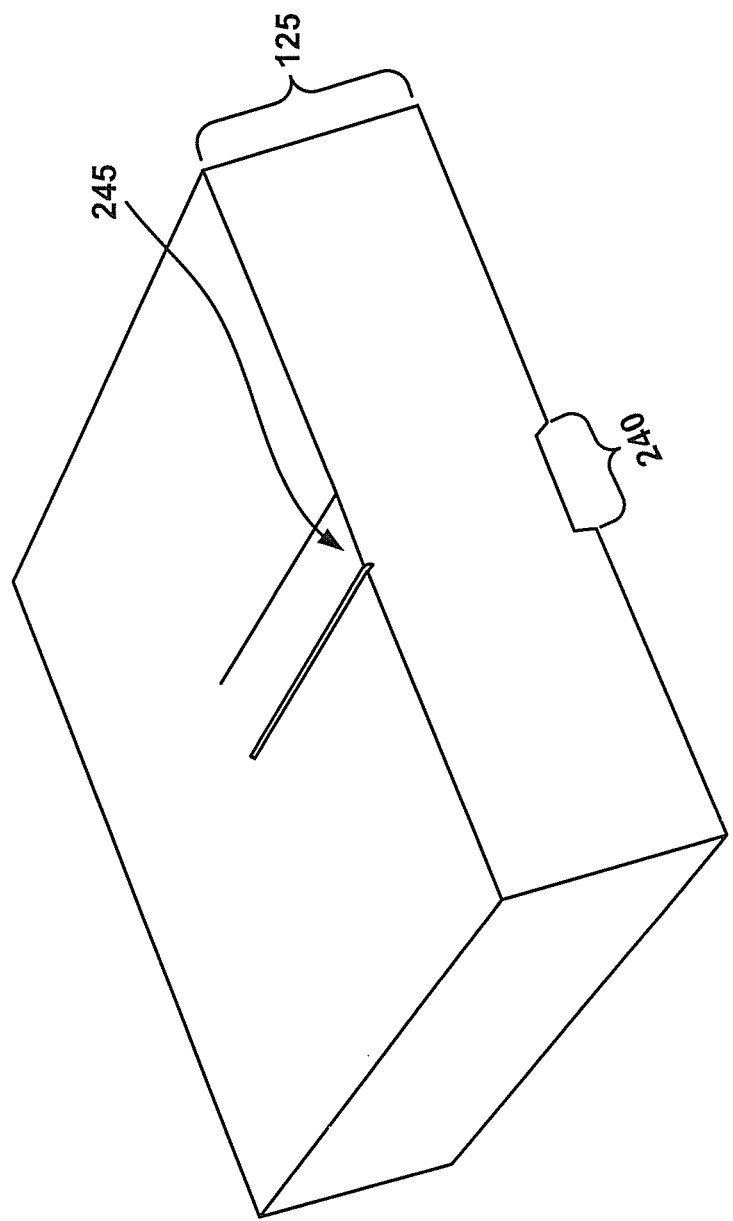
FIG. 2B is a block diagram of an example first attachment coupled with a slider within a hard disk drive, in accordance with embodiments of the present technology.

Referring now to FIG. 2B, a first attachment 245 coupled with a slider 125 is shown. Also depicted is an air bearing surface 240. In one embodiment, first attachment 245 is configured to be coupled with slider 125 and suspension 127 (not shown in FIG. 2B). In another embodiment, first attachment 245 is a cantilever. In one example, first attachment 245, coupled with slider 125 and suspension 127, is configured to enhance vertical flexibility already occurring in first material 205, thereby further reducing slider bounce.

For example, a first end of first attachment 245 may be coupled with suspension 127 and a second end of first attachment 245 may be coupled with a non-disk facing portion of slider 125. First attachment 245 is configured to flexibly carry slider 125 at the second end while remaining coupled with suspension 127 at the first end during interaction between slider 125 and disk 156. Thus, by the first attachment 245 flexibly adjusting its position in reaction to interaction between slider 125 and disk 156, first attachment 245 further helps to reduce slider bounce, and thus disk read/write errors.

Example Method for Reducing Slider Bounce within a Hard Disk Drive

FIG. 3 illustrates a method 300 for reducing slider bounce in HDD 100. Referring to 305 of FIG. 3, in one embodiment a force is received at first material 205 while first material 205 is in contact with disk 156. As described herein, first material 205 comprises a portion that is flexible in first direction 210 wherein first direction 210 is a direction that is normal to a surface of disk 156. As further described herein, first material 205 comprises a portion that is substantially non-flexible in second direction 215, wherein second direction 215 is a direction that is parallel to a surface of disk 156.

Referring to 310 of FIG. 3, at least the flexible part of first material 205 substantially absorbs the force associated with the interaction between first material 205 and disk 156, thereby reducing slider bounce within HDD 100. In essence, first material 205 adjusts itself to the topography of disk 156 while enabling substantially bounce free read/write functions. Additionally, the portion of first material 205 that is substantially non-flexible enables first material 205 to avoid being torqued due to these forces, thereby also reducing read/write error and wear on disk 156.

In another embodiment, and referring to 315 of FIG. 3, the force associated with contact between first material 205 and disk 156 may be further reduced by utilizing second material 220 coupled with a disk-facing side 222 of first material 205, wherein second material 220 is configured for making contact with disk 156.

In yet another embodiment, first set of one or more electrodes 225 and second set of one or more electrodes 230 described herein are configured to control distance 235 between first material 205 and disk 156 of HDD 100 via slider 125 by changing a voltage between first set of one or more electrodes 225 and second set of one or more electrodes 230. For example, the voltage may be increased between electrodes from first set of one or more electrodes 225 and second set of one or more electrodes 230. This increase in voltage has the effect of pulling first material 205 closer to slider 125 via the portion that is flexibly aligned in first direction 210. Thus, the dynamics of first material's 205 position relative to disk 156 may be controlled via slider 125 and the electrical circuitry coupled therewith.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device for reducing slider bounce, said device comprising:
    a first material forming a single protrusion from and coupled with a slider body of a hard disk drive at a non-recessed location of said slider body, said first material comprising a portion that is flexible in a first direction and is substantially non-flexible in a second direction, wherein said first material reduces said slider bounce while said first material is directly or indirectly in contact with a disk of said disk drive by substantially absorbing forces associated with interaction between said slider and said disk, wherein said first direction is a vertical direction, said vertical direction being a direction that is normal to said disk, wherein said second direction is a horizontal direction, said horizontal direction being a direction that is parallel to a surface of said disk, wherein said portion of said first material that is non-flexible in said second direction is stiffer than said portion that is flexible in said first direction; and
    a second material coupled with a disk-facing side of said first material, said second material configured for making contact with said disk, wherein said second material is of a same composition as said slider and is non-flexible in said vertical direction;
    a first set of one or more electrodes coupled with said first material; and
    a second set of one or more electrodes coupled with said first set of one or more electrodes and coupled with said slider, wherein said slider may cause a change in voltage between said first set of one or more electrodes and said second set of one or more electrodes, thereby effecting a changed distance between said first material and said disk.

2. The device of claim 1, wherein said second material is alumina.

3. The device of claim 2, further comprising a carbon overcoat.

4. The device of claim 1, wherein said second material is spherically-shaped.

5. A slider assembly used in a disk drive for reducing slider bounce, said slider assembly comprising:
   a slider;
   a first material forming a single protrusion from and coupled with a disk-facing portion of said slider at a non-recessed location of said disk-facing portion, said first material comprising a portion that is flexible in a first direction and is substantially non-flexible in a second direction, wherein said first material reduces said slider bounce while said first material is directly or indirectly in contact with a disk of said disk drive by substantially absorbing forces associated with interaction between said slider and said disk, wherein said first direction is a vertical direction, said vertical direction being a direction that is normal to said disk, wherein said second direction is a horizontal direction, said horizontal direction being a direction that is parallel to a surface of said disk, wherein said portion of said first material that is non-flexible in said second direction is stiffer than said portion that is flexible in said first direction;
   a second material coupled with a disk-facing side of said first material, said second material configured for making contact with said disk, wherein said second material is of a same composition as said slider and is non-flexible in said vertical direction;
   a first set of one or more electrodes coupled with said first material; and
   a second set of one or more electrodes coupled with said first set of one or more electrodes and coupled with said slider, wherein said slider may cause a change in voltage between said first set of one or more electrodes and said second set of one or more electrodes, thereby effecting a changed distance between said first material and said disk.

6. The slider assembly of claim 5, further comprising:
   a first attachment comprising a first end and a second end, said first end coupled with a suspension and said second end coupled with a non-disk facing portion of said slider, wherein said first attachment is configured to flexibly carry said slider at said second end while remaining coupled with said suspension at said first end, thereby reducing said slider bounce by absorbing a portion of said forces associated with interaction between said slider and said disk.

7. The slider assembly of claim 6, wherein said first attachment is a cantilever.

8. The slider assembly of claim 5, wherein said second material is alumina with a carbon overcoat.

9. The slider assembly of claim 5, wherein said second material is spherically-shaped.

* * * * *